United States Patent [19]

Baaso

[11] 4,125,077
[45] Nov. 14, 1978

[54] TWIST LOCK FOR FREIGHT CONTAINERS

[76] Inventor: George L. Baaso, 31418 Schoenherr, Apt. 4, Warren, Mich. 48093

[21] Appl. No.: 794,484

[22] Filed: May 6, 1977

[51] Int. Cl.² ............................................. B65J 1/22
[52] U.S. Cl. ........................... 105/366 B; 280/415 B; 280/DIG. 8; 296/35 R
[58] Field of Search .......................... 296/35 A, 35 R; 280/415 B, DIG. 8; 105/366 B, 463, 464

[56] References Cited

U.S. PATENT DOCUMENTS

| 3,752,511 | 8/1973 | Racy | 105/366 B |
| 3,820,474 | 6/1974 | Backteman et al. | 105/366 B |
| 3,894,493 | 7/1975 | Strecker | 105/366 B |

Primary Examiner—Joseph F. Peters, Jr.
Assistant Examiner—Donn McGiehan
Attorney, Agent, or Firm—Peter A. Taucher; John E. McRae; Nathan Edelberg

[57] ABSTRACT

A twist lock for detachably retaining a freight container on the bed of a transport vehicle, said lock being completely detachable from the vehicle bed when it is not needed, whereby the bed surface is unobstructed by projections that would interfere with movement or placement of freight on the bed surface.

4 Claims, 9 Drawing Figures

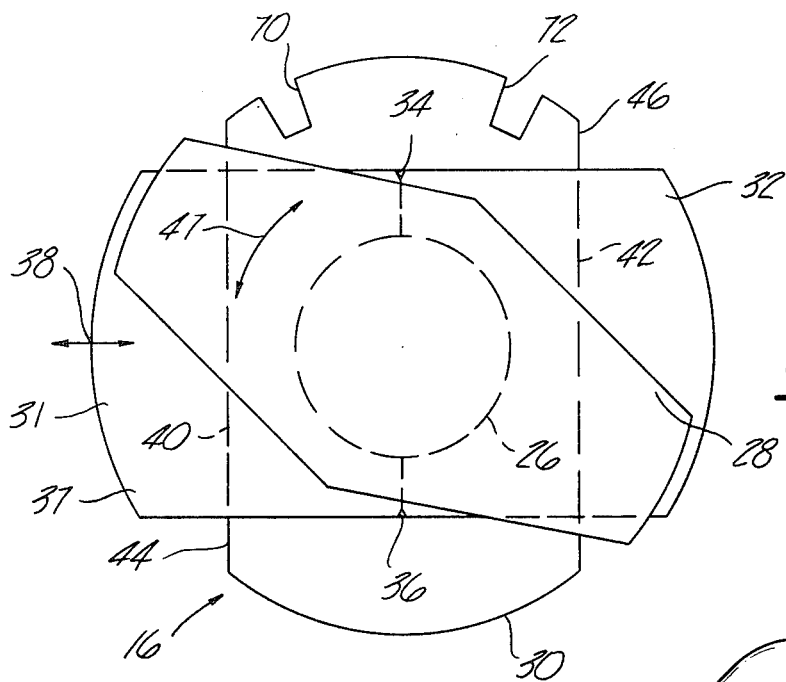
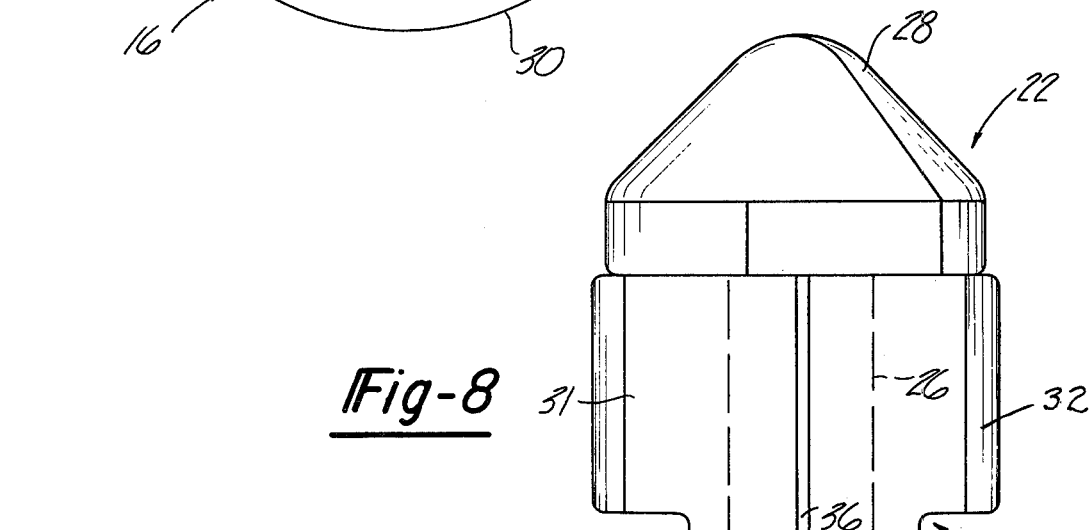
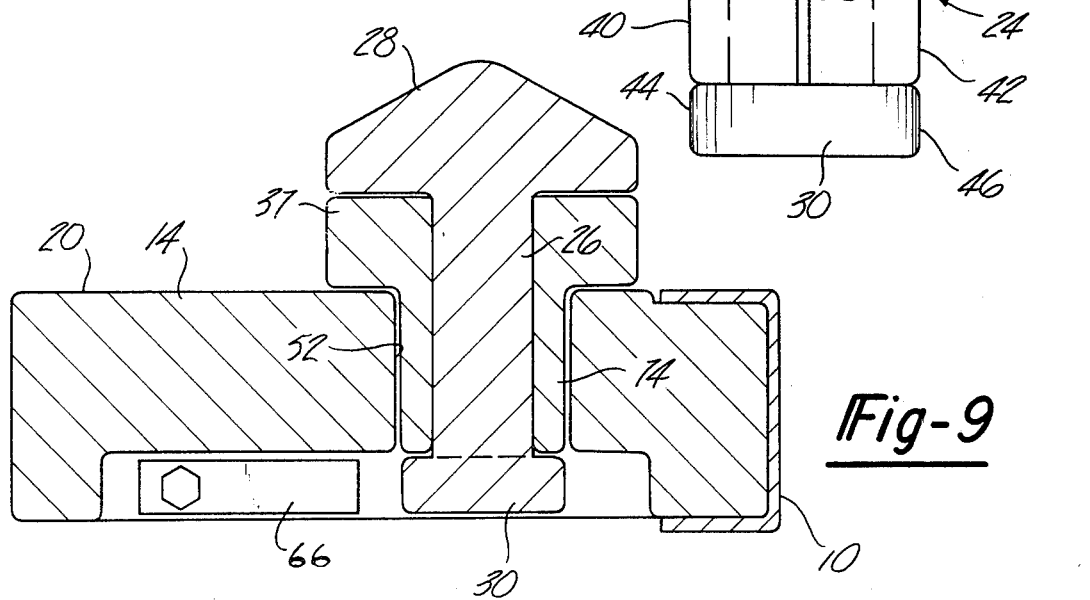

TWIST LOCK FOR FREIGHT CONTAINERS

BACKGROUND AND SUMMARY OF THE INVENTION

In the freight transportation field it is conventional practice to place cargo items in relatively large containers, and to load the containers onto flat beds or trailers or railroad cars. The corners of these large containers are defined by hollow block-like castings having slot-type openings in their lower faces. At selected points along the length of the vehicle bed there are usually disposed certain upstanding lock pins; each lock pin has an enlarged non-circular head for entry into one of the hollow castings at the corner of a freight container. The lock pins are spaced so that when the container is lowered onto the vehicle bed the upstanding lock pins automatically enter the slot type openings in the container corner castings. Each lock pin can be turned around its vertical axis so that its non-circular head overlies the casting lower wall, thereby locking the container against upward dislocation from the bed. U.S. Pat. No. 3,317,219 shows one form that such lock pins can take.

Freight containers have standard heights of eight feet and standard widths of eight feet. However the length can vary with different usage requirements; e.g. military transport containers are commonly either twenty feet long or ten feet long or 6 feet, 8 inches long. The length dimensions for the shorter containers are selected as even fractions of the longest container module length, whereby a twenty foot trailer can be used to handle different container combinations, such as one full length container or two 10-foot containers, or three of the smallest length containers.

Each container, whatever its length, must be anchored to the bed at all four of the container bottom corners. At least some of the anchoring or locking pins must therefore be either detachably or retractibly mounted on the vehicle bed in order that the containers or other cargo items will avoid striking portions of the non-used pins that would otherwise project above the bed surface.

An object of the present invention is to provide container twist locks that can be detachably mounted on the vehicle bed, thereby enabling the bed surface to be unobstructed by the presence of non-used locks. Other objects are to provide twist lock constructions that are relatively rigid and free from excessive wobble or play when mounted on the vehicle bed. Additional objects are to provide removable twist locks that are light weight, low cost, and small size. A particular object is to provide twist locks that do not project downwardly below the vehicle bed thickness, where they could strike tires or other structures such as suspension components, tail lights, support framework, etc.

The invention described herein may be manufactured, used, and licensed by or for the Government for governmental purposes without payment to me of any royalty thereon.

THE DRAWINGS

Figure 2:
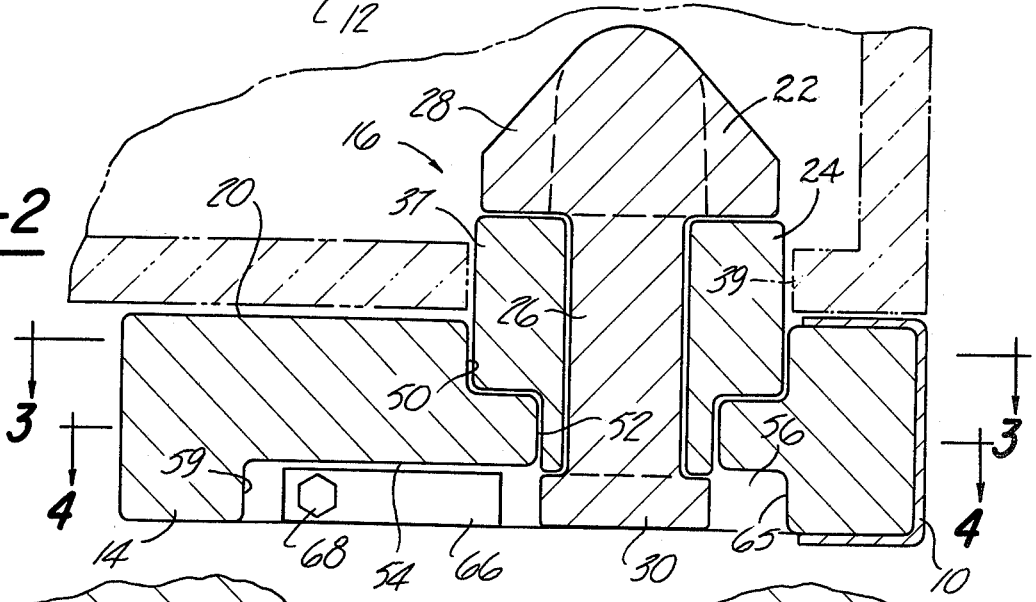
FIG. 2 is a sectional view taken on line 2—2 in FIG. 1.
Figure 3:
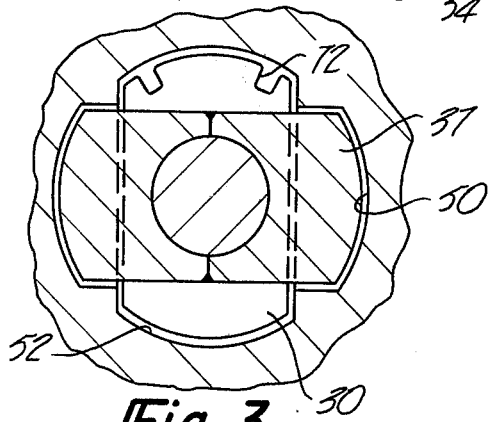
Figure 4:
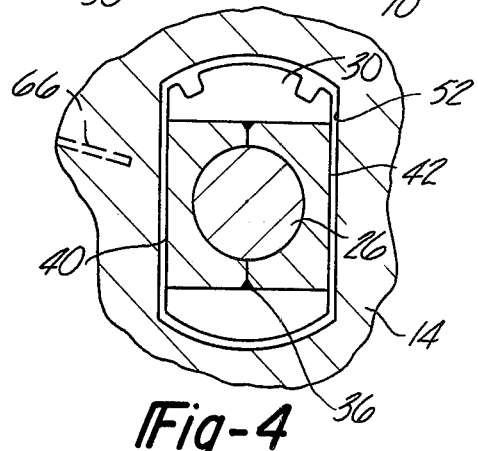

FIGS. 3 and 4 are fragmentary sectional views taken on lines 3—3 and 4—4, respectively, in FIG. 2.

Figure 1:
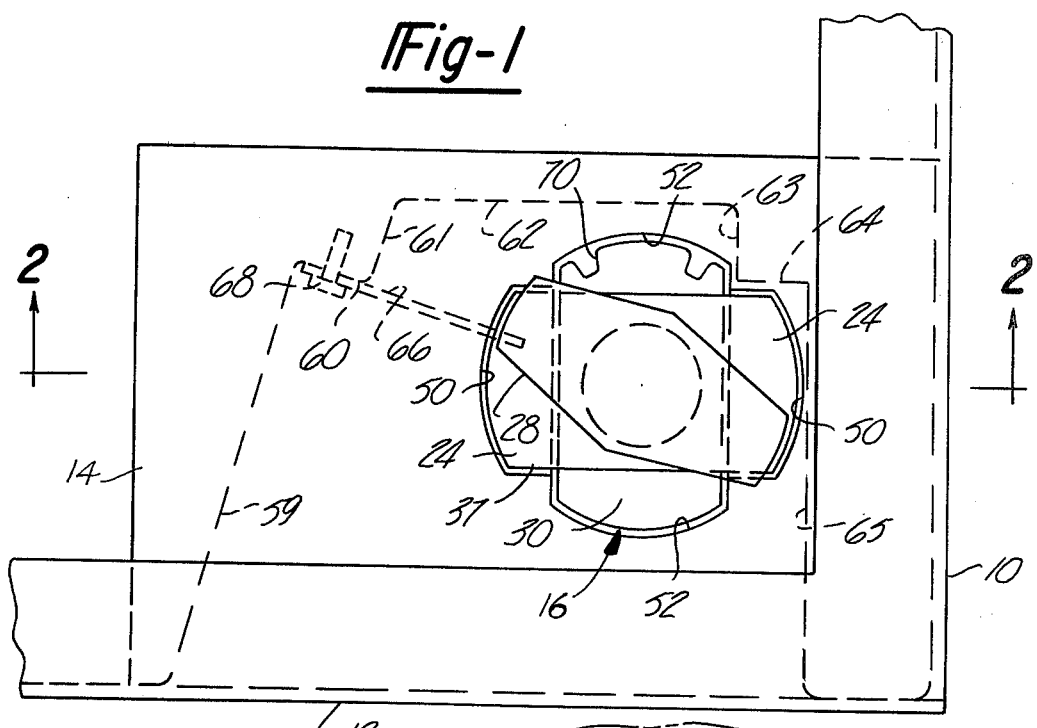
FIG. 1 is a top plan view of the corner area of a vehicle bed in which twist lock means of this invention is incorporated.
Figure 5:
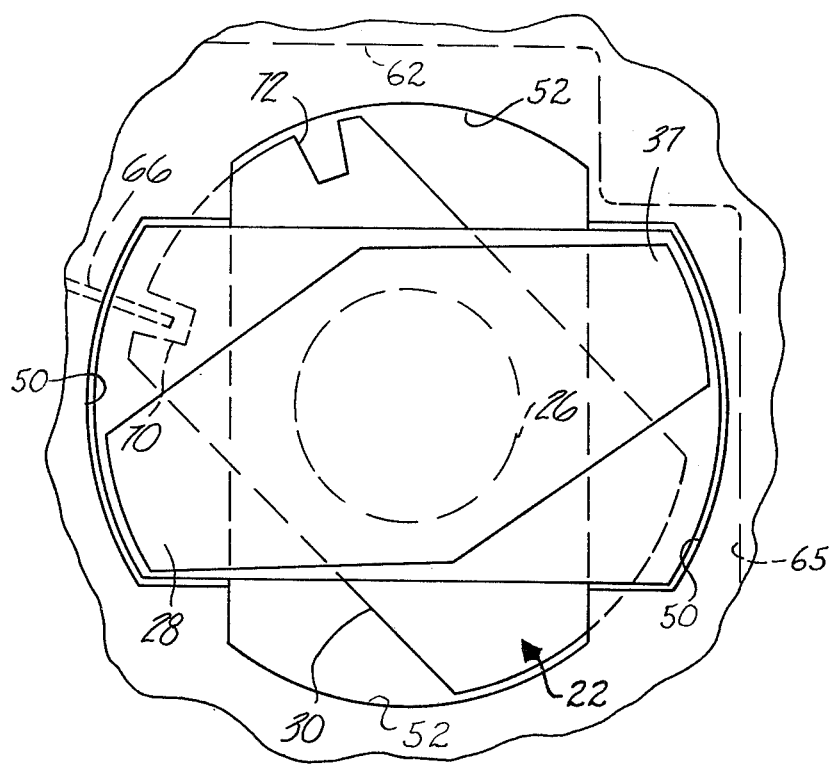
Figure 6:
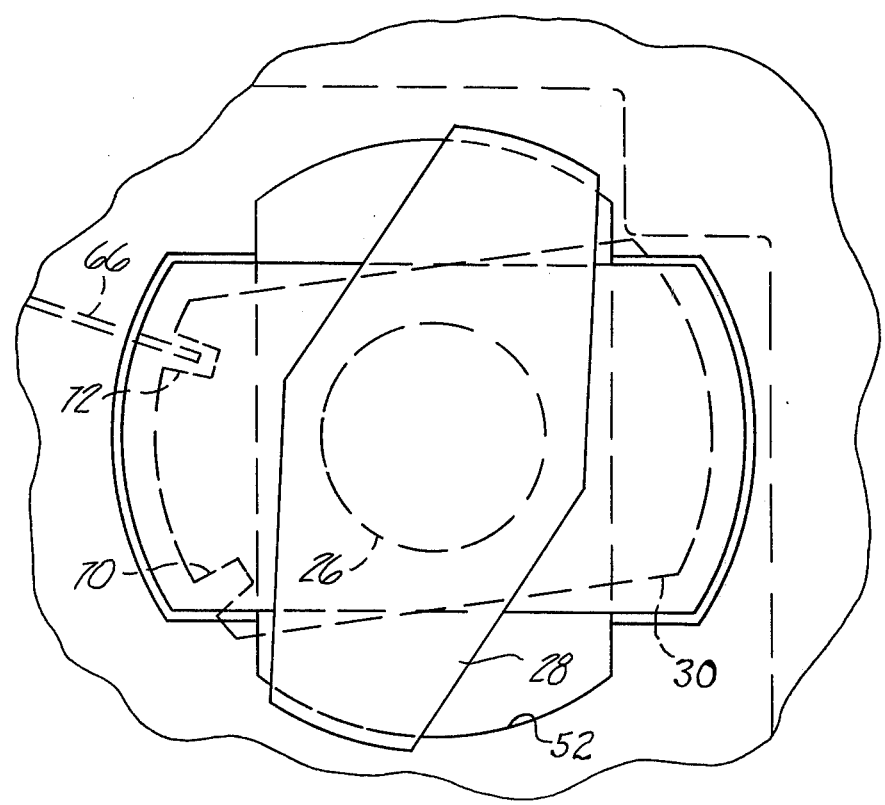

FIGS. 5 and 6 are fragmentary top plan views similar to FIG. 1, but showing the lock components in differently adjusted positions.

FIGS. 7 and 8 are top plan and side elevational views of a twist lock assembly used in the FIG. 1 vehicle bed.

FIG. 9 is a sectional view taken in the same direction as FIG. 2, but illustrating a second embodiment of the invention.

With particular reference to FIGS. 1 and 2, there is shown the corner area of a vehicle bed comprised of an end rail or channel 10 and a side rail or channel 12, each having a vertical dimension on the order of three inches, whereby planking or steel flooring (not shown) can be supported at its ends in or on the channel flanges in conventional fashion. The rails also form convenient support structures for cast metal supports 14 nested between the channel flanges; each metal casting removably mounts a twist lock assembly 16 that is designed for engagement with one corner of a cargo container, shown in phantom in FIG. 2. The number of cast metal supports 14 would correspond to the range of freight container sizes to be supported on the vehicle bed. For example, if we assume a twenty foot long trailer designed to handle three different length containers (such as one twenty foot length, two ten foot lengths, or three containers of 6 foot 8 inches length) then as many as twelve twist lock assembly supports 14 would be mounted at pre-designated locations along the bed length. Preferably all castings 14 and twist lock assemblies 16 are the same, whereby different twist lock assemblies can be used interchangeably in the various support castings. The aim is of course to promote parts standardization, high parts volume and low cost. Each twist lock assembly is capable of complete separation from the associated support casting 14, whereby the bed upper face (defined in part by the casting upper face 20) is devoid of the obstructions that such twist lock assemblies would otherwise present to cargo items when the assemblies are not in use.

Each twist lock assembly 16 is constructed as shown in FIGS. 7 and 8. Referring to those FIGS., the assembly comprises a one piece lock pin 22 and locator sleeve 24. Pin 22 consists of a circular cross section shank 26, upper head 28, and lower head 30. Each of these heads is of non-circular configuration in plan outline (FIG. 7). Locator sleeve 24 consists of two similar half sections 31 and 32 joined together along vertical weld lines 34 and 36 to form a generally rectangular structure 37 in top plan outline (FIG. 7). The lower parts of half sections 31 and 32 are of reduced lateral dimension measured along direction line 38, whereby the defined side edges 40 and 42 are in vertical alignment with side edges 44 and 46 on lower head 30 (when pin 22 is in the rotational position shown in FIGS. 7 and 8). Locator sleeve 24 has a rotary fit on circular shank 26, whereby the lock pin 26 can be rotated around the pin vertical axis in the general fashion designated by arrow 47.

FIGS. 1 and 2 show the assembly of FIGS. 7 and 8 releasably nested on or in the support member 14 that forms part of the vehicle cargo bed. Member 14 is preferably a one piece metal casting configured to define a rectangular cavity 50 in its upper face 20. Extending generally crosswise of cavity 50 is a rectangular slot 52. In the vertical direction slot 52 extends from upper face 20 to the casting underface 54 defined by recess 56. Recess 56 is enlarged in the horizontal dimension to form a relatively large space in which to gain wrench access to the lower head 30 of the lock pin 22. As seen in FIG. 1, this enlarged recess is defined by vertical interior surfaces 59, 60, 61, 62, 63, 64 and 65.

The twist lock assembly 16 is installed into support member 14 by a downward movement of the assembly such that lower head 30 passes through rectangular slot 52. During this downward insertional movement the lock pin 22 is held in the rotated position of FIGS. 1 and 7. The twist lock assembly is oriented so that locator sleeve 24 fits into rectangular cavity 50; the assembly assumes the position of FIGS. 1 and 2.

The twist lock assembly 16 is releasably retained on bed member 14 by application of a counterclockwise turning force on upper head 28 or lower head 30 until the lock pin 22 assumes the FIG. 5 position. Comparing FIGS. 1 and 5, it will be seen that in the FIG. 5 condition one corner of lower head 30 underlies lower face 54 (FIG. 2) of member 14; the lower head thereby prevents upward dislocation of the locator-lock pin assembly from member 14.

The lock pin 22 is releasably retained in its FIG. 5 position by means of a spring leaf detent 66 that is suitably mounted on surface 60 by means of a bolt 68 (see FIGS. 1 and 2). The leaf extends along an imaginary line that intersects the axis of lock pin 22, whereby the detent is operable during either clockwise or counterclockwise motion of the lock pin. During the latter stages of the lock pin movement from the FIG. 1 position to the FIG. 5 position the edge of lower head 30 strikes leaf 66, thereby deflecting the leaf and generating a spring force. The leaf bends around its mounting bolt 68, whereby the lock pin movement can continue until the generated spring force snaps the spring into notch 70 in the edge of lower head 30.

In the FIG. 5 position of lock pin 22 the upper head 28 aligns with the rectangular locator sleeve portion 37, i.e. the peripheral edges of head 28 are within the perimetrical outline of rectangular sleeve portion 37 as the assembly is viewed in FIG. 5. Alignment of head 28 with locator sleeve portion 37 enables the freight container to be lowered onto bed surface 20 (FIG. 2) without striking the upper surface of head 28. It should be explained at this point that locator sleeve portion 37 is configured and oriented to conform with the aforementioned slot in the corner casting of the cargo container; this slot is designated by numeral 39 in FIG. 2.

The upper area of locator sleeve portion 37 projects upwardly above bed surface 20. Therefore, when the container is correctly lowered onto the bed surface sleeve portion 37 enters into the slot 39 in the container corner casting, thereby locating the container on the bed and preventing lateral shift therealong.

The upper head 28 of the lock pin is disposed within a cavity formed in the container corner casting. Therefore, further turning or twisting movement of the lock pin enables head 28 to extend generally crosswise of slot 39 in a "container lock" condition. FIG. 6 illustrates the position of head 28 when the container is locked.

It will be appreciated that when the container is lowered onto the vehicle bed it is not possible to gain access to head 28. Turning motion of the lock pin from the FIG. 5 condition to the FIG. 6 condition is achieved by applying a wrench or similar tool to lower head 30. As the lock pin reaches its FIG. 6 position the end of spring leaf 66 snaps into a second notch 72 in the edge of lower head 30, thereby releasably retaining the lock pin in its "container-lock" condition. If leaf 66 is formed of sufficiently stiff material the leaf will retain the lock pin in place against normal road forces. Actually there should not be much of a dislocation force on the spring because the spring acts in a horizontal plane whereas the load forces act on head 28 in a vertical direction.

When it is desired to remove the cargo container from the vehicle bed the lock pins are turned from the FIG. 6 "container-lock" position to the FIG. 5 "container-unlock" position. Spring detent 66 interacts with notch 70 to releasably retain the lock pin in the FIG. 5 condition.

The lock pin-locator assembly (FIGS. 7 and 8) can be completely removed from the vehicle bed by turning the lock pin to the FIG. 1 position and lifting the assembly out of the seat defined by cavity 50 and slot 52. Leaf 66 is at that time completely disengaged from the lock pin and thus offers no resistance to lift-out movement of the lock pin-locator sleeve assembly.

The structural arrangement of FIGS. 1 through 8 constitutes a preferred embodiment of the invention. A less preferred embodiment of the invention is shown in FIG. 9. In the FIG. 9 arrangement the bed casting 14 is formed with a slot 52 but no cavity 50. The locator sleeve is modified so that its lower section 74 fits into slot 52, thereby preventing rotation of the locator. Upper section 37 of the locator sleeve is shaped similarly to section 37 shown in FIGS. 5 and 7, but is of lesser vertical thickness. In the FIG. 9 embodiment lateral load forces from the freight container are applied through locator sleeve section 37 and thence through locator section 74 to the bed casting 14. This is a less preferred arrangement than FIG. 2 wherein the single thickened section 37 transmits the load forces directly to casting 14.

The lock pin and spring detent used in the FIG. 9 embodiment may be the same construction and orientation shown in FIGS. 1 through 8.

Each embodiment of the invention is characterized by the fact that the locator-lock pin assembly is configured for detachable mounting in a non-circular opening in the vehicle bed element 14. In the case of the FIG. 2 embodiment the non-circular mount opening is defined by cavity 50 and slot 52. In the case of the FIG. 9 embodiment the mount opening is defined solely by slot 52. In each case the lock pin will have three distinct positions, namely a "released" position (FIGS. 2 and 9), a "container-unlock" position (FIG. 5), and a "container-lock" position.

I wish it to be understood that I do not desire to be limited to the exact details of construction shown and described for obvious modifications will occur to a person skilled in the art.

I claim:

1. Twist lock means for retaining a multi-ton freight container on the bed element (14) of a transport vehicle: said lock means comprising a non-circular opening in the vehicle bed element; a two piece locator-lock pin assembly configured for detachable mounting in said non-circular opening; said locator comprising a sleeve having a lower non-circular retainer portion extendable through the non-circular opening to prevent sleeve rotation, and an upper non-circular operator portion locatable above the bed element upper face for mating engagement with a slot in the corner fitting of a freight container to thereby preclude lateral shift of the container along the bed element; the space surrounding the upper non-circular operator portion being unobstructed, whereby the freight container can be lowered directly onto the upper face of the bed element; said lock pin comprising a shank rotatably disposed within the sleeve, an upper head designed to enter into the container fitting to prevent upward dislocation of the container from the bed element, and a lower head designed to extend in a plane below the bed element lower face to prevent upward dislocation of the locator-lock pin assembly from the bed element; the upper and lower heads on the lock pin being non-circular in plan outline, said heads being angled relative to one another in a non-registering orientation; said lock pin having a first "released" position wherein the lower head registers with the non-circular bed element opening to permit insertional movement of the assembly into the bed element opening; said lock pin having a second "container-unlock" position wherein the lower head underlies the bed element lower face and the upper head aligns with the operator portion of the locator; said lock pin having a third "container-lock" position wherein the lower head underlies the bed element lower face and the upper head extends out of registry with the operator portion of the locator; and spring detent means mounted on the bed element for engagement with the lock pin lower head to releasably retain the lock pin in its "container-unlock" and "container-lock" positions; said detent means being completely disengaged from the lock pin when it is in its "released" position.

2. The twist lock means of claim 1 wherein the spring detent means comprises a spring leaf having one end fixedly mounted on the bed element and another end free in space, said spring leaf extending from its mounted end generally radially inwardly toward the lock pin axis to engage the peripheral edge of the lock pin lower head; said lower head having two notches in its peripheral edge for cooperative engagement with the free end of the spring leaf as the lock pin reaches its "container-lock" and "container-unlock" positions.

3. The twist lock means of claim 2 the lower face of the bed element being recessed (at 56) to house the spring leaf and the lock pin lower head.

4. The twist lock means of claim 1 the non-circular opening in the bed element comprising a rectangular cavity (50) in the bed element upper face, and a rectangular slot (52) extending downwardly from the bed element upper face to the bed element lower face; said slot extending at right angles to the rectangular cavity in the plan dimension; said locator sleeve having a rectangular plan outline conforming to the outline of the cavity, whereby the sleeve can be non-rotatably seated within the cavity with its operator portion projecting above the bed element upper face; the locator sleeve having a vertical thickness dimension slightly less than the axial dimension of the shank on the lock pin, whereby the pin and sleeve are prevented from relative movement in the axial direction.

* * * * *